United States Patent
Emerson et al.

(10) Patent No.: US 10,569,896 B2
(45) Date of Patent: Feb. 25, 2020

(54) CATALYTIC FUEL TANK INERTING SYSTEM

(71) Applicant: HAMILTON SUNDSTRAND CORPORATION, Charlotte, NC (US)

(72) Inventors: Sean C. Emerson, Broad Brook, CT (US); Barbara Brenda Botros, Vernon, CT (US); Zissis A. Dardas, Worcester, MA (US); Lance L. Smith, West Hartford, CT (US); Eric Surawski, Glastonbury, CT (US); Catherine Thibaud, South Windsor, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 15/849,274

(22) Filed: Dec. 20, 2017

(65) Prior Publication Data
US 2019/0185176 A1    Jun. 20, 2019

(51) Int. Cl.
*B01D 53/86*    (2006.01)
*B64D 37/32*    (2006.01)

(52) U.S. Cl.
CPC .......... *B64D 37/32* (2013.01); *B01D 53/8668* (2013.01); *B01D 2257/7022* (2013.01)

(58) Field of Classification Search
CPC .... B01D 53/00; B01D 53/86; B01D 53/8668; B01D 2257/70–7022; B64D 37/00; B64D 37/32
See application file for complete search history.

(56) References Cited

U.S. PATENT DOCUMENTS

| | | | |
|---|---|---|---|
| 2,801,159 | A | 7/1957 | Carton et al. |
| 3,847,298 | A | 11/1974 | Hamilton |
| 4,347,221 | A | 8/1982 | Zamma et al. |
| 6,818,189 | B1 | 11/2004 | Adris et al. |
| 7,195,742 | B2 | 3/2007 | Liu et al. |
| 7,694,916 | B2 | 4/2010 | Limaye et al. |
| 7,896,292 | B2 | 3/2011 | Limaye et al. |
| 7,905,259 | B2 | 3/2011 | Johnson et al. |
| 8,602,362 | B2 | 12/2013 | Buchwald |
| 8,828,344 | B2 | 9/2014 | K-Wlam |
| 9,687,773 | B2 | 6/2017 | Johnson et al. |
| 2006/0003402 | A1 | 1/2006 | Adris et al. |

(Continued)

FOREIGN PATENT DOCUMENTS

EP    0931586 A1    7/1999

OTHER PUBLICATIONS

European Search Report for European Application No. 18213585.5 dated Apr. 25, 2019; 11 Pages.

*Primary Examiner* — Natasha E Young
(74) *Attorney, Agent, or Firm* — Cantor Colburn LLP (57) ABSTRACT

A fuel tank inerting system is disclosed. In addition to a fuel tank, the system includes a catalytic reactor with an inlet, an outlet, a reactive flow path between the inlet and the outlet, and a catalyst on the reactive flow path. The catalytic reactor is arranged to receive fuel from the fuel tank and air from an air source, and to react the fuel and air along the reactive flow path to generate an inert gas. The system also includes an inert gas flow path from the catalytic reactor to the fuel tank. The system also includes (a) an air distributor in the catalytic reactor arranged to distribute air along the reactive flow path, or (b) non-uniform catalyst loading or non-uniform catalyst composition along the reactive flow path, or both (a) and (b).

18 Claims, 4 Drawing Sheets

(56) References Cited

U.S. PATENT DOCUMENTS

2008/0199376 A1    8/2008   Limaye et al.
2009/0227034 A1    9/2009   Limaye et al.
2011/0262309 A1   10/2011   Limaye et al.
2016/0156252 A1    6/2016   Balsiger et al.

CATALYTIC FUEL TANK INERTING SYSTEM

BACKGROUND

The subject matter disclosed herein generally relates to fuel handling systems, and more particularly to fuel tank inerting systems such as used on aircraft.

It is recognized that fuel vapors within fuel tanks become combustible in the presence of oxygen. An inerting system decreases the probability of combustion of flammable materials stored in a fuel tank by maintaining a chemically non-reactive or inert gas, such as nitrogen-enriched air, in the fuel tank vapor space, also known as ullage. Three elements are required to initiate and sustain combustion: an ignition source (e.g., heat), fuel, and oxygen. Combustion may be prevented by reducing any one of these three elements. If the presence of an ignition source cannot be prevented within a fuel tank, then the tank may be made inert by: 1) reducing the oxygen concentration, 2) reducing the fuel concentration of the ullage to below the lower explosive limit (LEL), or 3) increasing the fuel concentration to above the upper explosive limit (UEL). Many systems reduce the risk of combustion by reducing the oxygen concentration by introducing an inert gas such as nitrogen-enriched air (NEA) to the ullage, thereby displacing oxygen with a mixture of nitrogen and oxygen at target thresholds for avoiding explosion or combustion.

It is known in the art to equip aircraft with onboard inert gas generating systems, which supply nitrogen-enriched air to the vapor space (i.e., ullage) within the fuel tank. The nitrogen-enriched air has a substantially reduced oxygen content that reduces or eliminates combustible conditions within the fuel tank. Onboard inert gas generating systems typically use membrane-based gas separators. Such separators contain a membrane that is permeable to oxygen and water molecules, but relatively impermeable to nitrogen molecules. A pressure differential across the membrane causes oxygen molecules from air on one side of the membrane to pass through the membrane, which forms oxygen-enriched air (OEA) on the low-pressure side of the membrane and NEA on the high-pressure side of the membrane. The requirement for a pressure differential necessitates a source of compressed or pressurized air. Bleed air from an aircraft engine or from an onboard auxiliary power unit can provide a source of compressed air; however, this can reduce available engine power and also must compete with other onboard demands for compressed air, such as the onboard air environmental conditioning system and anti-ice systems. Moreover, certain flight conditions such as during aircraft descent can lead to an increased demand for NEA at precisely the time when engines could be throttled back for fuel savings so that maintaining sufficient compressed air pressure for meeting the pneumatic demands may come at a significant fuel burn cost. Additionally, there is a trend to reduce or eliminate bleed-air systems in aircraft; for example Boeing's 787 has a no-bleed systems architecture, which utilizes electrical systems to replace most of the pneumatic systems to improve fuel efficiency, as well as reduce weight and lifecycle costs. Other aircraft architectures may adopt low-pressure bleed configurations where engine design parameters allow for a bleed flow of compressed air, but at pressures less than the 45 psi air (unless stated otherwise, "psi" as used herein means absolute pressure in pounds per square inch, i.e., psia) that has been typically provided in the past to conventional onboard environmental control systems. A separate compressor or compressors can be used to provide pressurized air to the membrane gas separator, but this undesirably increases aircraft payload, and also represents another onboard device with moving parts that is subject to maintenance issues or device failure.

BRIEF DESCRIPTION

A fuel tank inerting system is disclosed. In addition to a fuel tank, the system includes a catalytic reactor that comprises an inlet, an outlet, a reactive flow path between the inlet and the outlet, and a catalyst on the reactive flow path. The catalytic reactor is arranged to receive fuel from the fuel tank and air from an air source, and to react the fuel and air along the reactive flow path to generate an inert gas. The system also includes an inert gas flow path from the catalytic reactor to the fuel tank. The system also includes (a) an air distributor in the catalytic reactor arranged to distribute air along the reactive flow path, or (b) non-uniform catalyst loading or non-uniform catalyst composition along the reactive flow path, or both (a) and (b).

In some embodiments, the catalytic reactor includes the air distributor arranged to distribute air along the reactive flow path.

In some embodiments, the catalytic reactor includes a catalyst bed, and the air distributor comprises a conduit comprising an inlet in operative fluid communication with the air source, and an oxygen-permeable sidewall in operative fluid communication with the catalyst bed.

In some embodiments, the conduit extends through the catalyst bed.

In any one or combination of the foregoing embodiments, the conduit includes an inlet disposed upstream of the catalyst bed, and an outlet, wherein the sidewall has a relatively greater permeability to oxygen toward the conduit inlet, compared to oxygen permeability toward the conduit outlet.

In any one or combination of the foregoing embodiments, the conduit is arranged substantially parallel to the reactive flow path.

In any one or combination of the foregoing embodiments, the system includes a plurality of the conduits.

In any one or combination of the foregoing embodiments, the system further includes a cooling conduit comprising an inlet and an outlet in operative fluid communication with a fluid coolant, and a sidewall in operative thermal communication with the catalyst bed.

In any one or combination of the foregoing embodiments, the catalyst bed is arranged along the reactive flow path to define an upstream surface, and the conduit is arranged in a plane substantially parallel to and in operative fluid communication with the upstream surface.

In any one or combination of the foregoing embodiments, the catalytic reactor further includes non-uniform catalyst loading or non-uniform catalyst composition along the reactive flow path.

In any one or combination of the foregoing embodiments, the catalytic reactor includes non-uniform catalyst loading along the reactive flow path.

In any one or combination of the foregoing embodiments, the catalytic reactor includes non-uniform catalyst composition along the reactive flow path.

In any one or combination of the foregoing embodiments, the catalytic reactor includes non-uniform catalyst loading along the reactive flow path, and non-uniform catalyst composition along the reactive flow path.

In any one or combination of the foregoing embodiments, said non-uniform catalyst loading or composition produces lower reactivity toward the reactor inlet compared to reactivity toward the reactor outlet.

In any one or combination of the foregoing embodiments, said non-uniform catalyst loading or composition produces higher reactivity toward the reactor inlet compared to reactivity toward the reactor outlet.

In any one or combination of the foregoing embodiments, the catalytic reactor comprises a plurality of catalyst beds, each bed having a uniform internal catalyst composition and loading, and different catalyst concentration or loading among the plurality of catalyst beds.

In any one or combination of the foregoing embodiments, the reactor includes at least one catalyst bed comprising a gradient or other internal non-uniformity of catalyst composition or loading.

In any one or combination of the foregoing embodiments, the system further includes a recycle flow path from the inert gas flow path to the catalytic reactor or to a feed stream to the catalytic reactor.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1A:
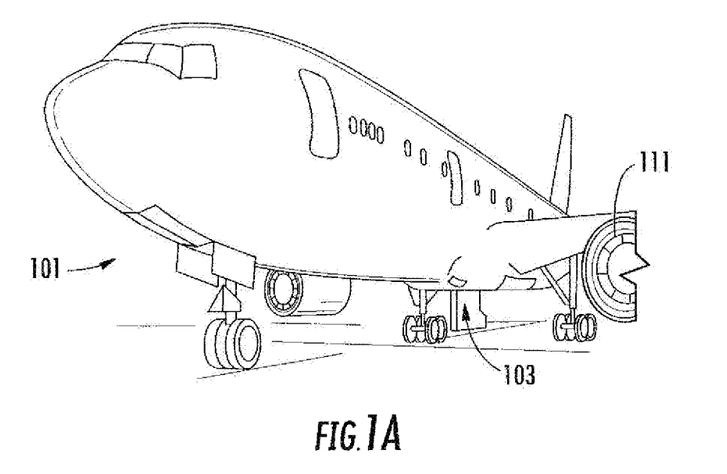
FIG. 1A is a schematic illustration of an aircraft that can incorporate various embodiments of the present disclosure.
Figure 1B:
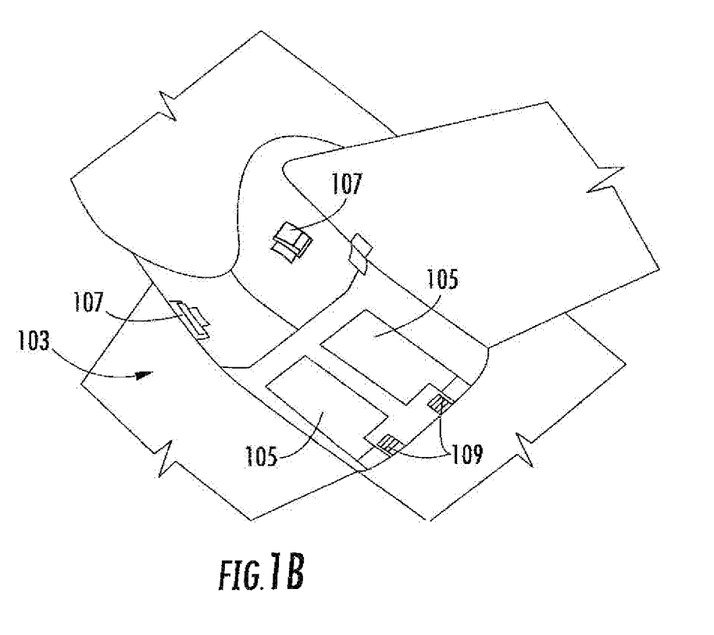
FIG. 1B is a schematic illustration of a bay section of the aircraft of FIG. 1A.

As shown in FIGS. 1A-1B, an aircraft 101 can include one or more bays 103 beneath a center wing box. The bay 103 can contain and/or support one or more components of the aircraft 101. For example, in some configurations, the aircraft 101 can include environmental control systems and/or fuel inerting systems within the bay 103. As shown in FIG. 1B, the bay 103 includes bay doors 105 that enable installation and access to one or more components (e.g., environmental control systems, fuel inerting systems, etc.). During operation of environmental control systems and/or fuel inerting systems of the aircraft 101, air that is external to the aircraft 101 can flow into one or more ram air inlets 107. The outside air may then be directed to various system components (e.g., environmental conditioning system (ECS) heat exchangers) within the aircraft 101. Some air may be exhausted through one or more ram air exhaust outlets 109.

Also shown in FIG. 1A, the aircraft 101 includes one or more engines 111. The engines 111 are typically mounted on wings of the aircraft 101, but may be located at other locations depending on the specific aircraft configuration. In some aircraft configurations, air can be bled from the engines 111 and supplied to environmental control systems and/or fuel inerting systems, as will be appreciated by those of skill in the art.

As noted above, typical air separation modules operate using pressure differentials to achieve desired air separation. Such systems require a high pressure pneumatic source to drive the separation process across the membrane. Further, the hollow fiber membrane separators commonly used are relatively large in size and weight, which is a significant consideration with respect to aircraft (e.g., reductions in volume and weight of components can improve flight efficiencies). Embodiments provided herein can provide reduced volume and/or weight characteristics of air separation modules for aircraft. In accordance with some embodiments of the present disclosure, the typical hollow fiber membrane separator can be replaced by a catalytic system (e.g., $CO_2$ generation system), which can be, for example, smaller, lighter, more durable, and/or more efficient than the typical fiber membrane separators. The catalytic system can be used on any fuel tank system, whether stationary (e.g., a tank farm) or on a vehicle with on-board fuel (i.e., fueled vehicle) such as an aircraft, ship, submarine or other marine vehicle, or land vehicle.

A function of fuel tank flammability reduction systems in accordance with embodiments of the present disclosure is accomplished by reacting a small amount of a first reactant (e.g., fuel vapor) with a second reactant (e.g., oxygen from an oxygen source such as an air source). The product of this reaction is carbon dioxide and water vapor. The source of the second reactant (e.g., air) can be bleed air or any other source of air containing oxygen, including, but not limited to, high-pressure sources (e.g., engine), bleed air, cabin air, etc. A catalyst material such as a noble metal catalyst is used to catalyze the chemical reaction. The carbon dioxide that results from the reaction is an inert gas, and is directed back within a fuel tank to create an inert environment within the fuel tank, thus reducing the flammability of the vapors in the fuel tank.

As mentioned above, a catalyst is used to catalyze a chemical reaction between oxygen ($O_2$) and fuel to produce carbon dioxide ($CO_2$) and water. The source of $O_2$ used in the reaction can come from any of a number of air sources, including, but not limited to, pneumatic sources on an aircraft that supply air at a pressure greater than ambient. Fuel for the reaction from the tank can be vaporized before mixing and reacting with air on the catalyst. The fuel can be heated to promote vaporization of the fuel, such as by using an electric heater. Any inert gas species that are present with the reactants (for example, nitrogen) will not react and will thus pass through the catalyst unchanged.

In some embodiments, the catalyst can be in a form factor that acts as a heat exchanger. For example, in one non-limiting configuration, a plate fin heat exchanger configuration is employed wherein a hot side of the heat exchanger would be coated with catalyst material. In such arrangement, the cold side of the catalyst heat exchanger can be fed with a cool air source, such as ram air or some other source of cold air. The air through the cold side of the heat exchanger can be controlled such that the temperature of a hot, mixed-gas stream is hot enough to sustain a desired chemical reaction within or at the catalyst. Further, the cooling air can be used to maintain a cool enough temperature to enable removal of heat generated by exothermic reactions at the catalyst.

The catalytic chemical reaction between fuel and air also generates water. Water in the fuel tank can be undesirable. Thus, in accordance with embodiments of the present disclosure, the water from a product gas stream can be removed through various mechanisms, including, but not limited to, condensation. The product gas stream can be directed to enter a heat exchanger downstream from the catalyst that is used to cool the product gas stream such that the water vapor condenses out of the product gas stream. The liquid water can then be drained overboard. In some embodiments, an optional water separator can be used to augment or provide water separation from the product stream.

Aircraft fuel tanks are typically vented to ambient pressure. At altitude, pressure inside the fuel tank is very low and is roughly equal to ambient pressure. However, during descent, the pressure inside the fuel tank needs to rise to equal ambient pressure at sea level (or at whatever altitude the aircraft is landing). This change in pressure requires gas entering the tank from outside to equalize with the pressure in the tank. When air from outside enters the tank, water vapor is normally present with it. Water can become trapped in the fuel tank and cause problems. In accordance with embodiments of the present disclosure, to prevent water from entering the fuel tanks, the fuel inerting systems of the present disclosure can repressurize the fuel tanks with dry inert gas that is generated as described above and below. The repressurization can be accomplished by using a flow control valve to control the flow of inert gas into the fuel tank such that a positive pressure is constantly maintained in the fuel tank. The positive pressure within the fuel tank can prevent air from entering the fuel tank from outside during descent and therefore prevent water from entering the fuel tank.

Figure 2:
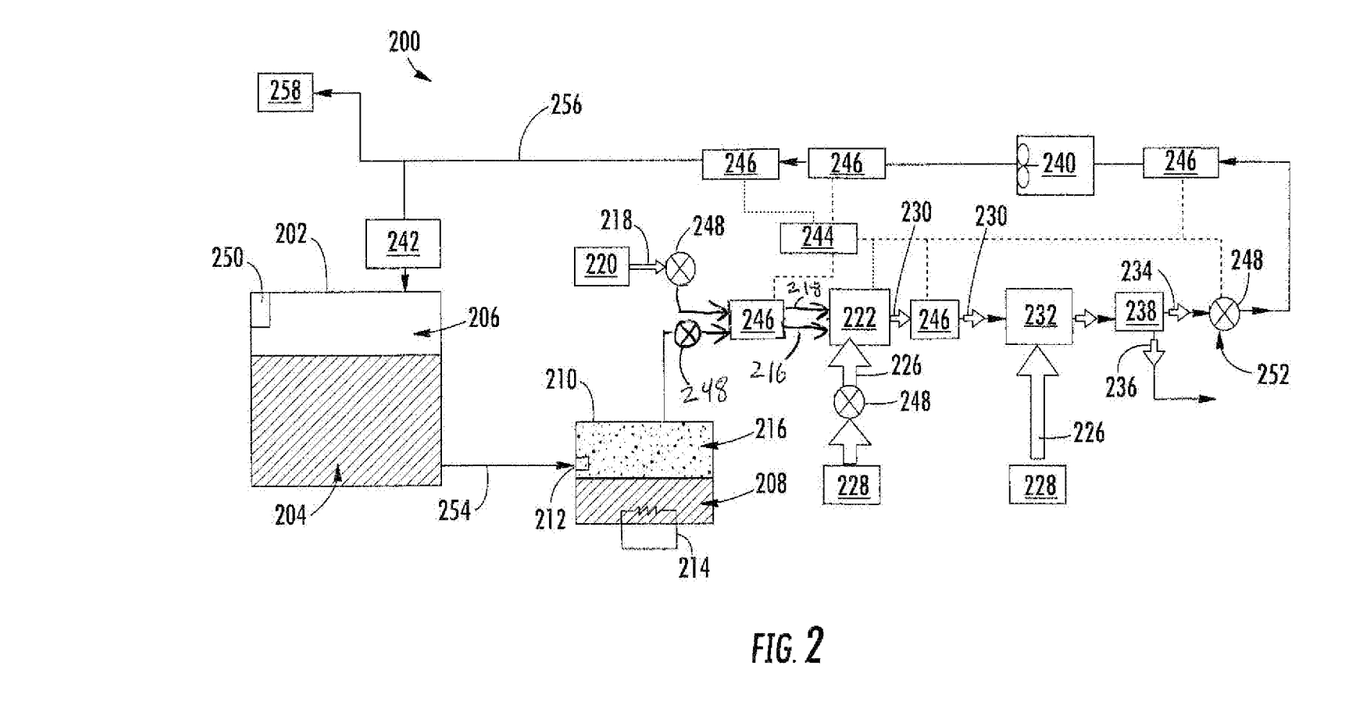
FIG. 2 is a schematic illustration of an example embodiment of a fuel tank inerting system.

FIG. 2 is a schematic illustration of a flammability reduction or inerting system 200 utilizing a catalytic reaction between first and second reactants to produce inert gas in accordance with an embodiment of the present disclosure. The inerting system 200, as shown, includes a fuel tank 202 having fuel 204 therein. As the fuel 204 is consumed during operation of one or more engines, an ullage space 206 forms within the fuel tank 202. To reduce flammability risks associated with vaporized fuel that may form within the ullage space 206, an inert gas can be generated and fed into the ullage space 206.

The inerting system 200 utilizes the catalytic reactor 222 to catalyze a chemical reaction between oxygen (second reactant 218) and fuel (first reactant 216) to produce carbon dioxide for the inert gas (inert gas 234) and water (byproduct 236). The source of the second reactant 218 (e.g., oxygen) used in the reaction can come from any source on the aircraft that is at a pressure greater than ambient, including but not limited to bleed air from an engine, cabin air, high pressure air extracted or bled from an engine, etc. (i.e., any second reactant source 220 can take any number of configurations and/or arrangements). Even non-air oxygen sources can be used, and "air" is used herein as a short-hand term for any oxygen-containing gas. As described in greater detail below, in some embodiments fuel can be introduced to a catalytic reactor in vapor or liquid form. To provide fuel in vapor form, an inerting fuel 208 can be extracted from the fuel tank 202 and into an evaporator container 210. The inerting fuel 208 within the evaporator container 210 can be heated using the electric heater 214.

With continued reference to FIG. 2, the first and second reactants are introduced to the catalytic reactor 222, which catalyzes a chemical reaction that transforms the reactants into the inert gas 234 and the byproduct 236 (e.g., carbon dioxide and water vapor). In some embodiments, some of the second reactant (air) can be pre-mixed with the fuel before delivery to the reactor. It is noted that any inert gas species that are present in the reactants (for example, nitrogen from the air) will not react and will thus pass through the catalytic reactor 222 unchanged. In some embodiments, the catalytic reactor 222 is in a form factor that acts as a heat exchanger. For example, one non-limiting configuration may be a plate fin heat exchanger wherein the hot side of the heat exchanger would be coated with the catalyst material. Those of skill in the art will appreciate that various types and/or configurations of heat exchangers may be employed without departing from the scope of the present disclosure. The cold side of the catalyst heat exchanger can be fed with the cooling air 226 from the cool air source 228 (e.g., ram air or some other source of cold air). The air through the cold side of the catalyst heat exchanger can be controlled such that the reactor temperature is hot enough to sustain the chemical reaction desired within the catalytic reactor 222, but cool enough to remove the heat generated by the exothermic reaction, thus maintaining aircraft safety and materials from exceeding maximum temperature limits.

The catalytic reactor 222 can be temperature controlled to ensure a desired chemical reaction efficiency such that an inert gas can be efficiently produced by the inerting system 200 from the reactants. Accordingly, cooling air 226 can be provided to extract heat from the catalytic reactor 222 to achieve a desired thermal condition for the chemical reaction within the catalytic reactor 222. The cooling air 226 can be sourced from a cool air source 228. A catalyzed mixture 230 leaves the catalytic reactor 222 and is passed through a heat exchanger 232. The heat exchanger 232 operates as a condenser on the catalyzed mixture 230 to separate out an inert gas 234 and a byproduct 236 (e.g., water). A cooling air is supplied into the heat exchanger 232 to achieve the condensing functionality. In some embodiments, as shown, a cooling air 226 can be sourced from the same cool air source 228 as that provided to the catalytic reactor 222, although in other embodiments the cool air sources for the two components may be different. The byproduct 236 may be water vapor, and thus in the present configuration shown in FIG. 2, an optional water separator 238 is provided downstream of the heat exchanger 232 to extract the water from the catalyzed mixture 230, thus leaving only the inert gas 234 to be provided to the ullage space 206 of the fuel tank 202.

One of the valves 248 can be a flow control valve 252 that is arranged fluidly downstream from the catalytic reactor 222A, which can be used along with optional water separator 238 to control the flow of the inert gas 234 to a desired flow rate. An optional boost fan 240 can be used to boost the gas stream pressure of the inert gas 234 to overcome a pressure drop associated with ducting between the outlet of the heat exchanger 232 and the discharge of the inert gas 234 into the fuel tank 202. The flame arrestor 242 at an inlet to the fuel tank 202 is arranged to prevent any potential flames from propagating into the fuel tank 202.

Typically, independent of any aircraft flammability reduction system(s), aircraft fuel tanks (e.g., fuel tank 202) need to be vented to ambient pressure. Thus, as shown in FIG. 2, the fuel tank 202 includes a vent 250. At altitude, pressure inside the fuel tank 202 is very low and is roughly equal to ambient pressure. During descent, however, the pressure inside the fuel tank 202 needs to rise to equal ambient pressure at sea level (or whatever altitude the aircraft is landing at). This requires gas entering the fuel tank 202 from outside to equalize with the pressure in the tank. When air from outside enters the fuel tank 202, water vapor can be carried by the ambient air into the fuel tank 202. To prevent water/water vapor from entering the fuel tank 202, the inerting system 200 can repressurize the fuel tank 202 with the inert gas 234 generated by the inerting system 200. This is accomplished by using the valves 248 such as control valve 252. The flow control valve 252 can be used to control the flow of inert gas 234 into the fuel tank 202 such that a slightly positive pressure is always maintained in the fuel tank 202. Such positive pressure can prevent ambient air from entering the fuel tank 202 from outside during descent and therefore prevent water from entering the fuel tank 202.

A controller 244 can be operably connected to the various components of the inerting system 200, including, but not limited to, the valves 248 and the sensors 246. The controller 244 can be configured to receive input from the sensors 246 to control the valves 248 and thus maintain appropriate levels of inert gas 234 within the ullage space 206. Further, the controller 244 can be arranged to ensure an appropriate amount of pressure within the fuel tank 202 such that, during a descent of an aircraft, ambient air does not enter the ullage space 206 of the fuel tank 202.

In some embodiments, the inerting system 200 can supply inert gas to multiple fuel tanks on an aircraft. As shown in the embodiment of FIG. 2, an inerting supply line 254 fluidly connects the fuel tank 202 to the evaporator container 210. After the inert gas 234 is generated, the inert gas 234 will flow through a fuel tank supply line 256 to supply the inert gas 234 to the fuel tank 202 and, optionally, additional fuel tanks 258.

Figure 3:
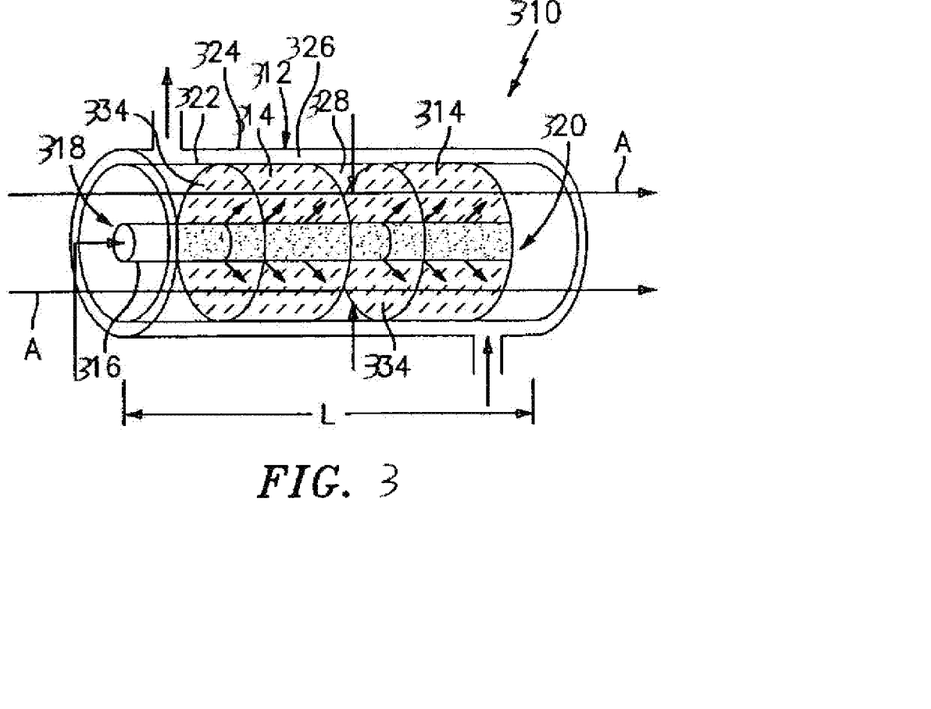
FIG. 3 is a schematic illustration of an example embodiment of a catalytic reactor of a fuel tank inerting system.

As mentioned above, the inerting system includes a catalytic reactor with (a) an air distributor arranged to distribute air along the reactive flow path between the reactor inlet and the reactor outlet, and/or (b) a non-uniform catalyst loading and/or catalyst composition adsorbent on the reactive flow path. With reference now to FIG. 3, there is shown an example embodiment of a catalytic reactor 310 a housing 312 defining a reactive flow path (arrows A) for a flow of fuel and air. Reactor 310 will typically house at least one catalyst bed 314, and FIG. 3 illustrates a configuration of the present embodiment with two catalyst beds 314, each with an upstream surface 334 positioned along reactor 310 in a spaced relationship. As further shown in FIG. 3, a conduit 316 is provided for distributing air flow within reactor 310 for reaction with fuel along the reactive flow path. In some embodiments, the conduit 316 can be tubular element so as to provide for substantially uniform and even distribution of oxygen through reactor 310. Other conduit shapes and configurations can also be used. The conduit 316 can be positioned passing through or upstream of catalyst beds 314 as described below so as to provide desirable uniform distribution of oxygen.

With continued reference to FIG. 3, the conduit 316 is shown positioned substantially concentric with housing 312, and passing through both catalyst beds 314. In this embodiment, the conduit 316 is shown as including a sidewall, or at least portions of a sidewall, that is/are permeable to oxygen to assist in an even distribution of oxygen through reactor 310 and through the catalyst beds 314. The sidewall of conduit 316 can be rendered permeable to oxygen in several ways. In some embodiments, the sidewall of conduit 316 can be fabricated from a material permeable to oxygen (e.g., an air-permeable membrane or oxygen-permeable membrane). In some embodiments, the conduit 316 can be provided with oxygen permeable sections by precision machining holes of the desired size in various locations thereon. Alternatively, and also as set forth above, the conduit 316 can be provided with portions of material that are selectively permeable to oxygen. As a further alternative, conduit 316 can be made from a porous metal, optionally with sections of different porosity along the reactor length.

Pressure variations induced by the inert gas-forming reaction of fuel and air can disrupt the even distribution of oxygen in the reactor 310, and can lead to localized variations in oxygen-to-fuel ratio which can create hot spots in the reactor or cause other problems. In some embodiments, pressure variations can be managed by selecting hole size or membrane permeability along the conduit 316 (e.g., along the length of conduit 316) to promote even distribution of oxygen in the reactor 310 to achieve a target flow of reactive oxygen (e.g., a constant or uniform flow of oxygen along the length of the conduit 316). In some embodiments, the conduit 316 has holes through the sidewalls which are greater in area at inlet end 318 than they are at outlet end 320. In some embodiments, the area of such holes gradually decrease in size per length of conduit 316 from inlet end 318 to outlet end 320 to accommodate a pressure drop along the reactive flow path with a progressively decreasing cross-sectional flow area through the conduit sidewall as a function of axial position to accommodate for progressively lower back-pressure along the reactive flow path. The aggregate hole area can be controlled by either or both of the number of holes or the diameter of the holes. In some embodiments, the sidewall of conduit 316 can be positioned within reactor 310 such that inlet end 318 is substantially accessible for flow of oxygen, typically of air containing oxygen, and that outlet end 320 terminates a distance from the inlet of reactor 310, which can be equal to between 5 and 100% of the length of reactor 310.

In some embodiments, such as the example embodiment shown in FIG. 3, the housing 312 can be arranged as a double-shell housing, with an inner shell 322 defining the reactive flow path A, and an outer shell 324 defining an annular space 326 between the inner shell 322 and the outer shell 324 defining a coolant fluid flow path. In some embodiments, such as the example embodiment shown in FIG. 3, a plurality of catalyst beds 314 can be spaced along the length of reactor 310. This spacing defines a gap 328 between beds that can be used for injection of air, water, fuel, or other materials. In some embodiments, an air distributor such as conduit 316 can promote reactor thermal management with reduced reliance on heat exchanger structures, thereby allowing for reduced size or presence of heat exchanger structures and/or reduced reactor size.

Figure 4:
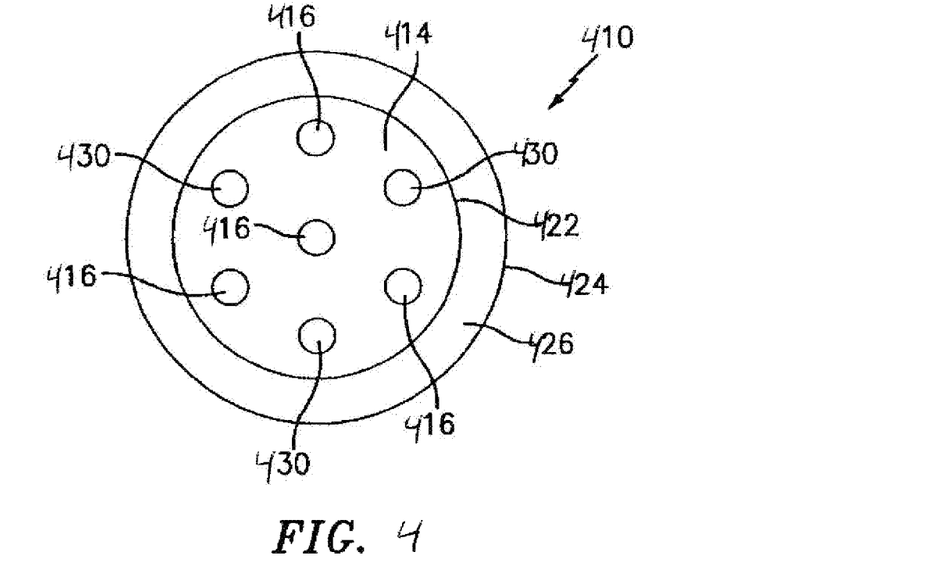
FIG. 4 is a schematic illustration of another example embodiment of a catalytic reactor of a fuel tank inerting system.

In some embodiments, a reactor can include a plurality of conduits as shown in the end view of reactor 410 in FIG. 4. As shown in FIG. 4, a plurality of tubular elements 416 are provided passing along reactor 410 through catalyst beds 414 to distribute oxygen. In the embodiment of FIG. 4, the center conduit and three of the perimeter conduits are conduits 416 carrying air/oxygen as described above for conduit 316. In this embodiment, optional conduits 430 carry a fluid coolant in fluid/thermal communication with a heat sink (not shown). FIG. 4 further shows an inner shell 422 and outer shell 424 defining an annular flow path space 426, similar to the arrangement shown in FIG. 3.

Figure 5:
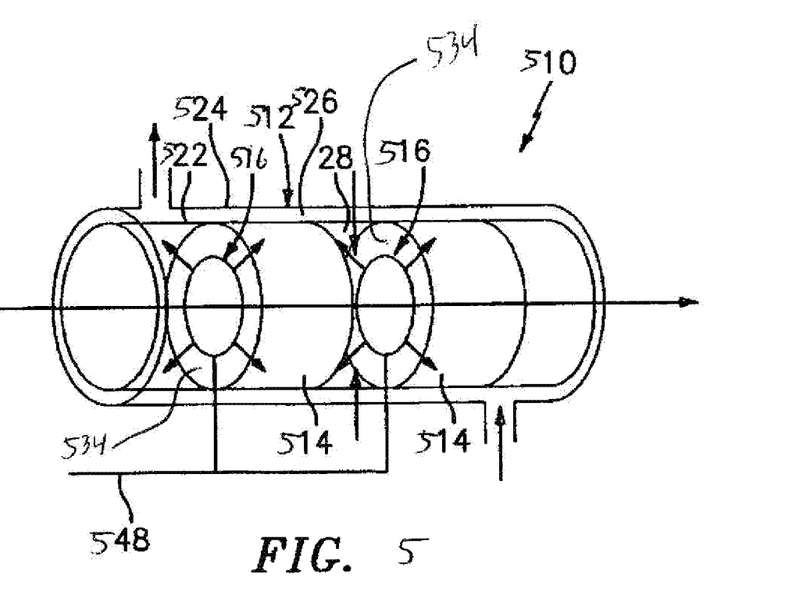
FIG. 5 is a schematic illustration of another example embodiment of a catalytic reactor of a fuel tank inerting system.

With reference now to FIG. 5, an example embodiment is shown in which gas distributors 516 are provided in a substantially planar configuration positioned substantially adjacent to a leading or upstream surface 534 of catalyst beds 514. The gas distributors receive flow from an air inlet 548 and distribute it in the direction of the arrows radially outward parallel to the upstream surface 534. The gas distributors can be formed from tubular conduits having gas-permeable sidewalls and are disposed in a ring or spiral configuration in a plane parallel to the upstream surface 534, or from other configurations that distribute the gas radially outward parallel to the upstream surface 534. In this embodiment, air flow can be distributed evenly upstream of and across the front surface 534 of catalyst beds 514, which can promote a uniform distribution of air across the catalyst bed across a wide type of catalyst configurations including monolith configurations.

In some embodiments, a control member (not shown) can be included for controlling the air flow through the conduits or portions of the conduit in response to operating conditions or parameters (e.g., inert gas system demand, process temperatures, etc.). Another way to control air flow through the conduits into the reactor along the reactive flow path is to provide an inner conduit having an outer surface in sliding engagement with the inner surface of an outer conduit, with both conduits having holes aligned in a pattern that allows rotation of the conduits with respect to one another to selectively align sidewall holes for passage of air from the conduit to the reactive flow path. In some embodiments, the volume of air flow through the conduits, or the axial or radial distribution of air flow along the air distributor, or relative amounts of air that is pre-mixed with fuel before entering the reactor versus air that is distributed in the reactor by the air distributor, or any combination of these, can be controlled to maintain a system temperature such as a temperature in the catalytic reactor or at an outlet of the reactor. In some embodiments, the flow rates can be controlled to maintain a temperature at less than or equal to 325° C. In some embodiments, the flow rates can be controlled to maintain a temperature at less than or equal to 300° C. In some embodiments, the flow rates can be controlled to maintain a temperature at less than or equal to 275° C. In some embodiments, the flow rates can be controlled to maintain a temperature at less than or equal to 250° C.

As discussed above, in some embodiments, the catalytic reactor 310/410/510 can include non-uniform catalyst loading and/or non-uniform catalyst composition along the reactive flow path A. Variations in either or both of catalyst composition can be between different catalyst beds (with each bed individually having a uniform composition and/or catalyst loading), or variations can be within any one or more catalyst beds. Additionally variations in composition or loading can be step changes (i.e., with an abrupt or rapid change in composition or loading along the reactive flow path or conduit axis), or can be gradual or gradient variations in composition or loading along the reactive flow path or conduit axis. In some embodiments, a non-uniform catalyst loading or composition can produce lower reactivity (e.g., lower catalyst loadings or lower-activity composition) toward the reactor inlet compared to the reactor outlet. In some embodiments, a non-uniform catalyst loading or composition can produce higher reactivity (e.g., higher catalyst loadings or higher-activity composition) toward the reactor inlet compared to the reactor outlet.

Catalyst beds 514 can be provided with any suitable catalyst for enhancing the fuel/oxygen reaction. Suitable catalysts include noble metals (e.g. Pt, Pd, Ru, Au, Ag, Rh and combinations thereof), either self-supporting or on a support such as alumina. Catalyst can be provided as pellets, foam or in any other suitable configuration. Catalyst composition variations can be provided with numerous variations on catalyst metal and dopants. In some embodiments, an upstream catalyst bed or reactor section can include a lower activity transition metal oxide catalyst such as manganese oxide and a downstream bed or section can include a higher activity noble metal catalyst such as a platinum or palladium catalyst, as disclosed in U.S. patent application Ser. No. 15/849,165, the disclosure of which is incorporated herein by reference in its entirety. Catalyst loading variations can be accomplished using multiple washcoat steps selectively applied, or other metal deposition techniques. Catalyst loading variations can include catalyst loadings in a range having a lower end of 0.01 g/L, 0.02 g/L, or 0.05 g/L, and an upper end of 160 g/L, 180 g/L, or 200 g/L. The above upper and lower range endpoints can be independently combined to produce a number of different ranges, and each possible combination of range endpoints is hereby expressly disclosed.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A fuel tank inerting system, comprising:
a fuel tank;
a catalytic reactor comprising an inlet, an outlet, a reactive flow path between the inlet and the outlet, and a catalyst on the reactive flow path, said catalytic reactor arranged to receive fuel from the fuel tank and air from an air source, and to react the fuel and air along the reactive flow path to generate an inert gas; and
an inert gas flow path from the catalytic reactor to the fuel tank;
wherein the catalytic reactor includes an air distributor arranged to distribute air along the reactive flow path, wherein the catalytic reactor includes a catalyst bed and an air distributor arranged to distribute air along the reactive flow path, and the distributor comprises a conduit comprising an inlet in operative fluid communication with the air source, and an oxygen-permeable sidewall in operative fluid communication with the catalyst bed.

2. The fuel tank inerting system of claim 1, wherein the oxygen-permeable sidewall includes a plurality of holes that provide said oxygen permeability.

3. The fuel tank inerting system of claim 1, wherein the conduit extends through the catalyst bed.

4. The fuel tank inerting system of claim 1, wherein the conduit includes an inlet disposed upstream of the catalyst bed, and an outlet, wherein the sidewall has a relatively greater permeability to oxygen toward the conduit inlet, compared to oxygen permeability toward the conduit outlet.

5. The fuel tank inerting system of claim 1, wherein conduit is arranged substantially parallel to the reactive flow path.

6. The fuel tank inerting system of claim 1, comprising a plurality of said conduits.

7. The fuel tank inerting system of claim 1, further comprising a cooling conduit comprising an inlet and an outlet in operative fluid communication with a fluid coolant, and a sidewall in operative thermal communication with the catalyst bed.

8. The fuel tank inerting system of claim 1, wherein the catalyst bed is arranged along the reactive flow path to define an upstream surface, and the conduit is arranged in a plane substantially parallel to and in operative fluid communication with the upstream surface.

9. The fuel tank inerting system of claim 1, wherein the catalytic reactor further includes non-uniform catalyst loading or non-uniform catalyst composition along the reactive flow path.

10. The fuel tank inerting system of claim 9, wherein the catalytic reactor includes non-uniform catalyst composition along the reactive flow path.

11. The fuel tank inerting system of claim 9, wherein the catalytic reactor includes non-uniform catalyst loading along the reactive flow path.

12. The fuel tank inerting system of claim 11, wherein the oxygen-permeable sidewall includes an oxygen-permeable membrane that provides said oxygen permeability.

13. The fuel tank inerting system of claim 9, wherein said non-uniform catalyst loading or composition produces lower reactivity toward the reactor inlet compared to reactivity toward the reactor outlet.

14. The fuel tank inerting system of claim 9, wherein said non-uniform catalyst loading or composition produces higher reactivity toward the reactor inlet compared to reactivity toward the reactor outlet.

15. The fuel tank inerting system of claim 9, wherein the catalytic reactor comprises a plurality of catalyst beds, each bed having a uniform internal catalyst composition and loading, and different catalyst concentration or loading among the plurality of catalyst beds.

16. The fuel tank inerting system of claim 9, comprising at least one catalyst bed comprising a gradient or other internal non-uniformity of catalyst composition or loading.

17. The fuel tank inerting system of claim 9, wherein the catalytic reactor includes non-uniform catalyst loading and non-uniform catalyst composition along the reactive flow path.

18. The fuel tank inerting system of claim 1, further comprising a recycle flow path from the inert gas flow path to the catalytic reactor or to a feed stream to the catalytic reactor.

* * * * *